US010632911B2

(12) United States Patent
Lemieux

(10) Patent No.: US 10,632,911 B2
(45) Date of Patent: Apr. 28, 2020

(54) TRUCK SECURITY SYSTEMS AND RELATED METHODS

(71) Applicant: Groupe Gyrotech Inc., La Pocatière (CA)

(72) Inventor: Thomas Lemieux, Quebec (CA)

(73) Assignee: Groupe Gyrotech Inc., La Pocatière, Quebec (CA)

( * ) Notice: Subject to any disclaimer, the term of this patent is extended or adjusted under 35 U.S.C. 154(b) by 0 days.

(21) Appl. No.: 16/276,355

(22) Filed: Feb. 14, 2019

(65) Prior Publication Data

US 2020/0039432 A1    Feb. 6, 2020

Related U.S. Application Data

(60) Provisional application No. 62/764,360, filed on Jul. 31, 2018.

(51) Int. Cl.
*B60Q 1/00*  (2006.01)
*B60Q 9/00*  (2006.01)
*G01S 19/52*  (2010.01)
*B60P 1/04*  (2006.01)

(52) U.S. Cl.
CPC .................. *B60Q 9/00* (2013.01); *B60P 1/04* (2013.01); *G01S 19/52* (2013.01)

(58) Field of Classification Search
None
See application file for complete search history.

(56) References Cited

U.S. PATENT DOCUMENTS 5,528,499 A * 6/1996 Hagenbuch ............ G01G 19/08
                                                    701/29.4
9,796,267 B1 * 10/2017 Ruth ....................... B60K 35/00

* cited by examiner

*Primary Examiner* — Adolf Dsouza
(74) *Attorney, Agent, or Firm* — Brinks Gilson & Lione

(57) ABSTRACT

A dump truck security system and related methods for distinguishing a loading configuration and an unloading configuration of a truck bed are provided. The security system includes a transmitter, a target, a detector configured to generate a configuration signal, a controller operatively connected to the detector and configured to receive and process the configuration signal, and an alarm system. The alarm system includes a visual alarm and an audible alarm, both being mounted inside the driver cab to be visible and audible by a user. The visual alarm is configured to display a first color when the configuration signal is indicating that the truck bed is the loading configuration and display a second color when the configuration signal is indicating the truck bed is in the unloading configuration. The audible alarm is configured to emit a sound when the configuration signal is indicating the truck bed is the unloading configuration.

26 Claims, 8 Drawing Sheets

TRUCK SECURITY SYSTEMS AND RELATED METHODS

CROSS-REFERENCE TO RELATED APPLICATIONS

This application claims priority to U.S. provisional patent application No. 62/764,360 filed on Jul. 31, 2018, the entirety of which is hereby incorporated by reference.

TECHNICAL FIELD

The technical field generally relates to systems and methods for use in trucks for enhanced operation and functionality and more particularly concerns truck security systems and related methods.

BACKGROUND

Dump trucks and similar vehicles present potential risks to road users and road infrastructures. Indeed, such vehicles can typically move even though their beds or dumps are in an upright position. In such scenarios, the vehicles may impact road infrastructure, thus damaging the vehicles or the road infrastructure (e.g., such as viaducts and the like). Such impacts are typically associated with high repair costs or even fatalities.

There is thus a need for a system or device that addresses at least some of the challenges presented above.

SUMMARY

Various methods, kits and systems are provided to enhance safety of operations for trucks or similar vehicle.

In accordance with one aspect, there is provided a dump truck security system for distinguishing a loading configuration and an unloading configuration of a truck bed located behind a driver cab. The dump truck security system includes a transmitter affixable to a rear portion of the driver cab, the transmitter being operable to generate a transmission light towards a front portion of the truck bed, the transmission light having a spectral profile; a target provided near or at a front portion of the truck bed and being aligned with the transmitter when the truck bed is in the loading configuration, the target being reflective in the spectral profile of the transmission light; a detector affixable to the rear portion of the driver cab, the detector being positioned and configured to detect a reflected light and generate a signal representative of a configuration of the truck bed; a controller operatively connected to the detector, the controller being configured to receive and process the signal representative of the configuration of the truck bed; and an alarm system operatively connected to the controller and receiving instructions therefrom. The alarm system includes an audible alarm mounted inside the driver cab to be heard by the user, the audible alarm being configured to emit a sound when the signal representative of the configuration of the truck bed is indicating the truck bed is the unloading configuration.

In some embodiments, the alarm system further includes a visual alarm mounted inside the driver cab to be visible to a user, the visual alarm being configured to display a first color when the signal representative of the configuration of the truck bed is indicating that the truck bed is the loading configuration; and display a second color when the signal representative of the configuration of the truck bed is indicating the truck bed is in the unloading configuration.

In some embodiments, the spectral profile includes an infrared band.

In some embodiments, the spectral profile ranges from about 700 nm to about 1 mm.

In some embodiments, the transmitter and the detector form a single integrated device.

In some embodiments, the target is made of a material including an adhesive tape reflecting light in the spectral profile.

In some embodiments, the target is painted on said front portion of the truck bed.

In some embodiments, the target is affixable at said front portion of the truck bed.

In some embodiments, the target is substantially circular and has a diameter of about eight inches.

In some embodiments, the target defines a target plane associated with a first target axis and a second target axis passing through a target center.

In some embodiments, the first target axis and a second target axis are orthogonal one with another.

In some embodiments, the transmitter extends along a transmitter plane associated with a first transmitter axis and a second transmitter axis passing through a transmitter center.

In some embodiments, the first transmitter axis and a second transmitter axis are orthogonal one with another.

In some embodiments, the first target axis is parallel with first transmitter axis and the second target axis is aligned with the second transmitter axis.

In some embodiments, the first target axis and the first transmitter axis extend along a substantially horizontal direction and the second target axis and the second transmitter axis extend along a substantially vertical direction parallel to the force of gravity.

In some embodiments, the controller is programmed such that the signal representative of the configuration of the truck bed indicates that the truck bed is in the unloading configuration when a vertical position of the truck bed reaches a predetermined position threshold value with respect to a predetermined reference position.

In some embodiments, the predetermined position threshold value is about four inches above or below the predetermined reference position.

In some embodiments, the predetermined reference position is calculated from a center of the target.

In some embodiments, the controller is programmed such that at least one of the visual alarm and the audible alarm is delayed by a predetermined delay duration when the signal representative of the position indicates that the truck bed is in the unloading configuration; and the dump truck moves at a speed below a predetermined speed threshold value.

In some embodiments, the predetermined speed threshold value is adjustable in a range extending from about 15 km/h to about 20 km/h.

In some embodiments, the dump truck security system further includes a global positioning system (GPS) operatively connected to the controller, the GPS being configured to determine the speed at which the dump truck is moving.

In some embodiments, the predetermined delay duration is about 60 seconds.

In some embodiments, after the predetermined delay duration, at least one of the visual alarm displays the second color and the audible alarm emits the sound.

In some embodiments, the detector is electrically connected to the controller and the signal representative of the configuration of the truck bed is an electrical signal.

In some embodiments, the alarm system is electrically connected to the controller.

In some embodiments, the alarm system is wirelessly connected to the controller.

In some embodiments, the visual alarm includes a plurality of light-emitting diodes (LEDs).

In some embodiments, the LEDs are positioned and configured such that all of the LEDs simultaneously display either the first color or the second color.

In some embodiments, the controller is mounted behind a dashboard of the dump truck.

In some embodiments, the controller includes a logic circuit.

In accordance with another aspect, there is provided a kit for distinguishing a loading position and an unloading position of a truck bed, the kit including a transmitter operable to generate a transmission light having a spectral profile; a target reflective in the spectral profile of the transmission light; a detector operable to detect a reflected light and generate a signal representative of a configuration of a truck bed; a controller operable to receive and process the signal representative of the configuration of the truck bed; and an alarm system includes an audible alarm, the audible alarm being configured to emit a sound when the signal representative of the configuration of the truck bed is indicating the truck bed is the unloading configuration.

In some embodiments, the kit further includes a visual alarm configured to: display a first color when the signal representative of the configuration of the truck bed is indicating that the truck bed is the loading configuration and display a second color when the signal representative of the configuration of the truck bed is indicating the truck bed is in the unloading configuration.

In accordance with another aspect, there is provided a method for distinguishing a loading configuration and an uploading configuration of a truck bed located behind a driver cab, the method including providing a dump truck security system to a dump truck, the dump truck security system including: a transmitter affixable to a rear portion of the driver cab; a target affixable near or at a front portion of the truck; a detector affixable to the rear portion of the driver cab; a controller operatively connected to the detector, and an alarm system operatively connected to the controller, the alarm system including an audible alarm. The method also includes operating the transmitter to generate a transmission light towards the front portion of the truck bed; detecting light reflected by the target with the detector; generating a signal representative of a configuration of the truck bed; and operating the controller to process the signal representative of the configuration of the truck bed, and subsequently send instructions from the controller to the alarm system, such that when the signal representative of the configuration of the truck bed is indicating that the truck bed is in the unloading configuration, the audible alarm is operated to emit a sound.

In some embodiments, the alarm system further includes a visual alarm, the controller being configured such that when the signal representative of the configuration of the truck bed is indicating that the truck bed is the loading configuration, the visual alarm is operated to display a first color; and when the signal representative of the configuration of the truck bed is indicating that the truck bed is in the unloading configuration, the visual alarm is operated to display a second color.

In accordance with another aspect, there is provided a method for distinguishing a loading configuration and an uploading configuration of a truck bed located behind a driver cab, the method including generating a transmission light towards the truck bed; detecting a reflected light at a rear portion of the driver cab; generating a signal representative of a configuration of the truck bed; processing the signal representative of the configuration of the truck bed; and operating an alarm system including an audible alarm such that when the signal representative of the configuration of the truck bed is indicating that the truck bed is in the unloading configuration the visual alarm is operated to display a second color; and the audible alarm is operated to emit a sound.

In some embodiments, the alarm system further includes a visual alarm, the controller being configured such that when the signal representative of the configuration of the truck bed is indicating that the truck bed is the loading configuration, the visual alarm is operated to display a first color and when the signal representative of the configuration of the truck bed is indicating that the truck bed is in the unloading configuration, the visual alarm is operated to display a second color.

In accordance with another aspect, there is provided a method for installing a dump truck security system for distinguishing a loading configuration and an uploading configuration of a truck bed located behind a driver cab, the method including engaging a target with a front portion of the truck bed; aligning a transmitter with the target; engaging the transmitter with a rear portion of the driver cab; mounting a detector to the rear portion of the driver cab; operatively connecting a controller with the detector; mounting the controller in the driver cab; operatively connecting an alarm system with the controller; and mounting the alarm system in the drive cab.

In some embodiments, said aligning includes: determining a first target axis and a second target axis; determining a first transmitter axis and a second transmitter axis; aligning said first target axis with said first transmitter axis; and aligning said second target axis with said second transmitter axis.

Other features and advantages of the present description will become more apparent upon reading of the following non-restrictive description of specific embodiments thereof, given by way of example only with reference to the accompanying drawings.

DETAILED DESCRIPTION

Figure 1:
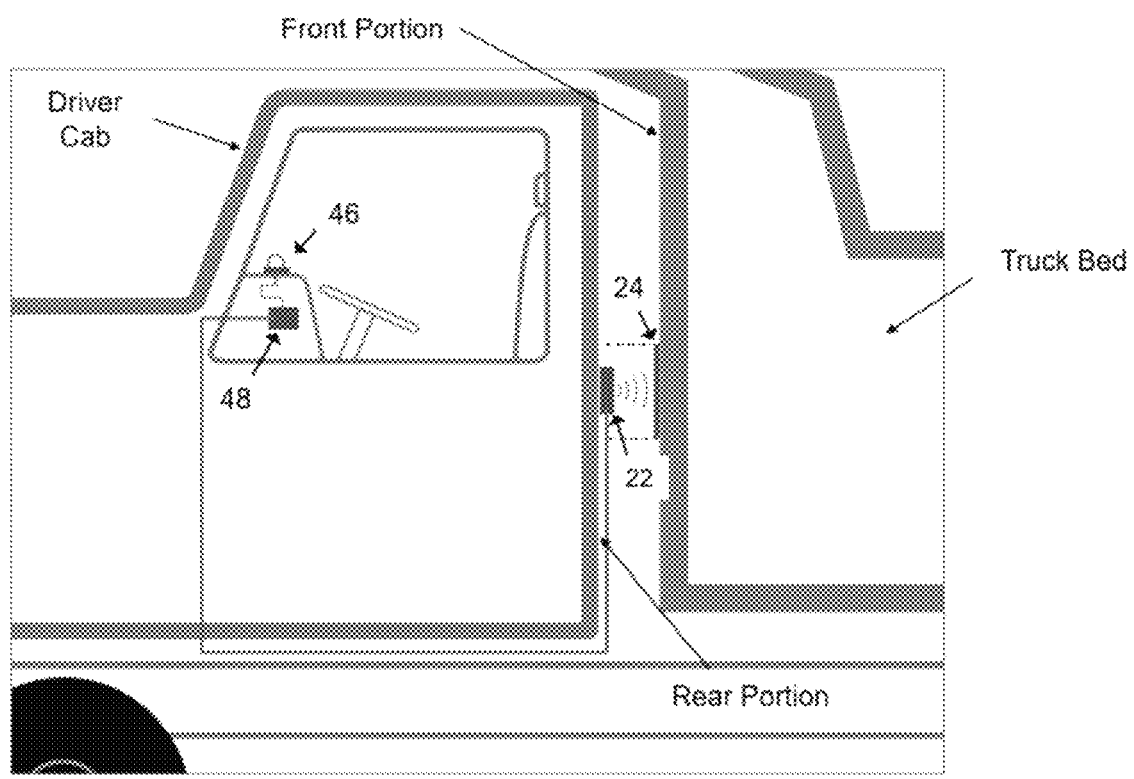
FIG. 1 illustrates an exemplary embodiment of a dump truck including a driver cab having a rear portion and a truck bed having a front portion.

In the following description, similar features in the drawings have been given similar reference numerals, and, to not unduly encumber the figures, some elements may not be indicated on some figures if they were already identified in one or more preceding figures. It should also be understood herein that the elements of the drawings are not necessarily depicted to scale, since emphasis is placed upon dearly illustrating the elements and structures of the present embodiments.

The terms "a", "an" and "one" are defined herein to mean "at least one", that is, these terms do not exclude a plural number of elements, unless stated otherwise. It should also be noted that terms such as "substantially", "generally" and "about", that modify a value, condition or characteristic of a feature of an exemplary embodiment, should be understood to mean that the value, condition or characteristic is defined within tolerances that are acceptable for the proper operation of this exemplary embodiment for its intended application.

In the present description, the terms "connected", "coupled", and variants and derivatives thereof, refer to any connection or coupling, either direct or indirect, between two or more elements. The connection or coupling between the elements may be mechanical, physical, optical, operational, electrical, wireless, or a combination thereof.

In the present description, the terms "light" and "optical", and any variants and derivatives thereof, are intended to refer to electromagnetic radiation in any appropriate region of the electromagnetic spectrum and are not limited to visible light. For example, in one embodiment, the terms "light" and "optical" may encompass electromagnetic radiation with a wavelength ranging from about 700 nm to about 1 mm. More particularly, although one embodiment of the present techniques can be useful in infrared range applications, other embodiments could additionally or alternatively operate in other regions of the electromagnetic spectrum, for example in the millimeter, terahertz, visible and ultraviolet regions.

It will be appreciated that positional descriptors indicating the position or orientation of one element with respect to another element are used herein for ease and clarity of description and should, unless otherwise indicated, be taken in the context of the figures and should not be considered limiting. It will be understood that spatially relative terms (e.g., "outer" and "inner", "top" and "bottom", "front" and "rear", "behind" and the like) are intended to encompass different positions and orientations in use or operation of the present embodiments, in addition to the positions and orientations exemplified in the figures.

The expressions "transmission light" and "reflected light" are used throughout the description. The expression "transmission" refers to light which is sent towards a truck bed. The expression "reflected light" refers to light emanating, i.e., being reflected by the truck bed after its irradiation by the transmission light. The reflected light can include light that has not been absorbed by the material forming the truck bed or light scattered and/or reflected by the truck bed. The reflected light could be, in some context, the result of various physical processes (e.g., luminescence, photoluminescence, fluorescence, phosphorescence, and the like). Hence, the resulting light is the light emanating from the truck bed after the interaction between the transmission light.

The following expressions will be used throughout the expression:

"Dump truck", which is sometimes referred to as "dumper truck". "tipper lorry", "tip-truck", "tipper" or "tipper truck", refers to industrial vehicles used for transporting material (e.g., loose material) or construction material. It is to be noted that the object of the current description is also compatible with semi-trailer truck. As such, the expression "truck" herein refers to any one of the aforementioned examples of trucks, as well as other similar industrial vehicles;

"Truck bed", which is sometimes referred to as "open-box bed" or "bucket", refers to the structure receiving the material therein. The structure can have the shape of an open box. The truck bed is typically hinged at the rear and mechanically connected to hydraulics systems, assemblies or rams to lift a front portion of the truck bed, thereby allowing to discharge the material contained in the truck bed behind the truck (e.g., on the ground). Alternatively, the truck bed could comprise a dray or the like;

"Driver cab" refers to the structure for receiving an operating user therein. The driver cab is typically located in front of the truck bed and is equipped with devices, assemblies and systems configured to operate the dump truck;

"Loading configuration" refers to a configuration or a position of the truck bed in which the truck bed can be loaded. In such a configuration a bottom plate of the truck bed defines a plane extending horizontally, i.e., in a direction substantially normal or perpendicular to the force of gravity. In some embodiments, the loading configuration can be referred to as a lowermost configuration, a down position or a low position; and "Unloading configuration" refers to a configuration or a position of the truck bed in which the truck bed can be unloaded. In such a configuration a bottom plate of the truck bed extends in a plane defining an angle with the force of gravity. This angle is typically different than 90 degrees. In some embodiments, the unloading configuration can be referred to as an uppermost configuration, an up position or a high position.

Different implementations of the systems, kits, methods and processes described herein can be used for indicating a loading configuration and an unloading configuration of a truck bed and can be adapted to a broad variety of applications. The use of the disclosed systems and kits facilitates enhancing safety of operations for dump truck or similar vehicles.

Broadly described, a dump truck security system for distinguishing a loading configuration and an unloading configuration of a truck bed located behind a driver cab can be advantageously implemented. The dump truck security system generally includes a transmitter, a target, a detector, a controller and an alarm system. The security system permits to indicate the status of the truck bed, i.e., its configuration, with a visual alarm and an audible alarm. The visual alarm can be mounted inside the driver cab to be visible to a user and the audible alarm mounted inside the driver cab to be heard by the user.

Figure 2A:
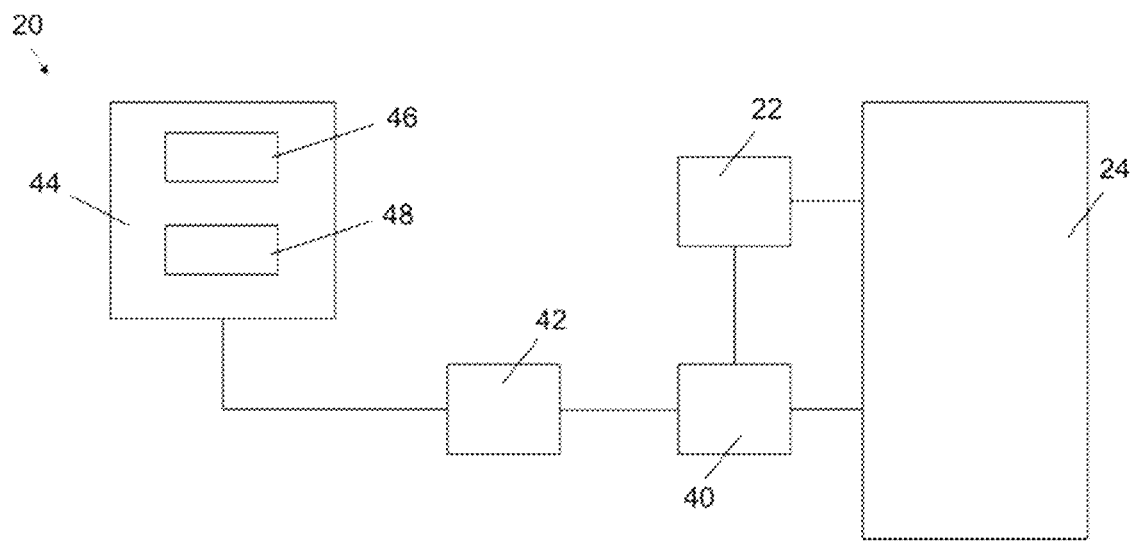
FIGS. 2A-B are a schematic representation of a dump truck security system, in accordance with some embodiments.
Figure 2B:
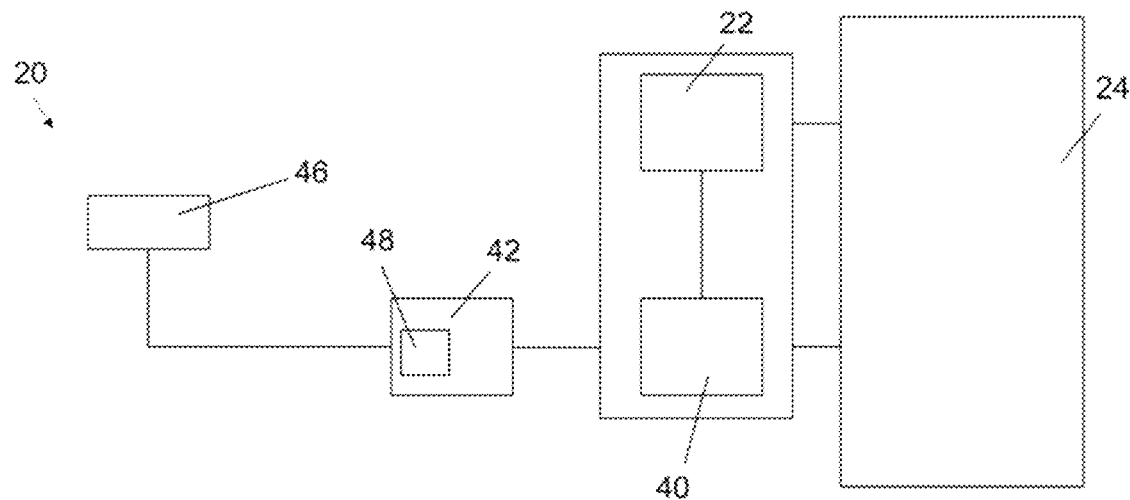

Dump Truck Security System for Distinguishing a Loading Configuration and an Unloading Configuration Referring to FIGS. 2A-B, schematic representations of a dump truck security system 20 are illustrated. As mentioned, the dump truck security system 20 (sometimes referred as the "security system") can enhance or improve security of operations for dump trucks and similar vehicles. The security system 20 can also be useful for providing audible and visual cues about the configuration and position of the truck bed.

As it will be described in the following section, the security system 20 typically includes a transmitter, a target, a detector, a controller and an alarm system.

Transmitter

As illustrated, and still referring to FIGS. 2A-B, the security system 20 includes a transmitter 22.

As for its positioning, the transmitter 22 is affixable to a rear portion of the driver cab. The transmitter 22 is operable to generate a transmission light. As such, in operation, the transmitter 22 generates the transmission light which is sent rearwardly from the driver cab and towards a front portion of the truck bed. In other embodiments, the transmitter 22 is mounted near the lift cylinder (e.g., the lift hydraulic cylinder configured to raise the truck bed).

The transmission light emitted by the transmitter 22 has a spectral profile. In some embodiments, the transmission light has a spectral profile including a waveband ranging from about 700 nm to about 1 mm. The spectral profile of transmitter 22 can be obtained with a single light source or by using a plurality of sub-sources. Alternatively, the transmitter 22 could emit in the UV, the visible, the NIR region and/or the IR region of the light spectrum.

The transmitter 22 is typically configured for emitting light in a continuous regime. It will however be readily understood that the transmitter 22 could be operated either in a continuous regime or an intermittent regime, according to one's needs and/or the targeted application(s). One skilled in the art will readily understand that the choice and the configuration of the transmitter 22 may be limited and/or influenced by predetermined parameters dictated by a given application. The predetermined parameters can for example include, but are not limited to wavelength, power, spatial profile and spectral profile.

In other embodiments, the transmitter can be based on other laser technologies. For instance, the transmitter can include, be compatible with or be implemented in a module or a surveying method measuring distance, such as and without being limitative LIDAR ("light detection and ranging" or "light imaging, detection and ranging").

Target

Still referring to FIGS. 2A-B, the security system 20 includes a target 24.

Figure 3A:
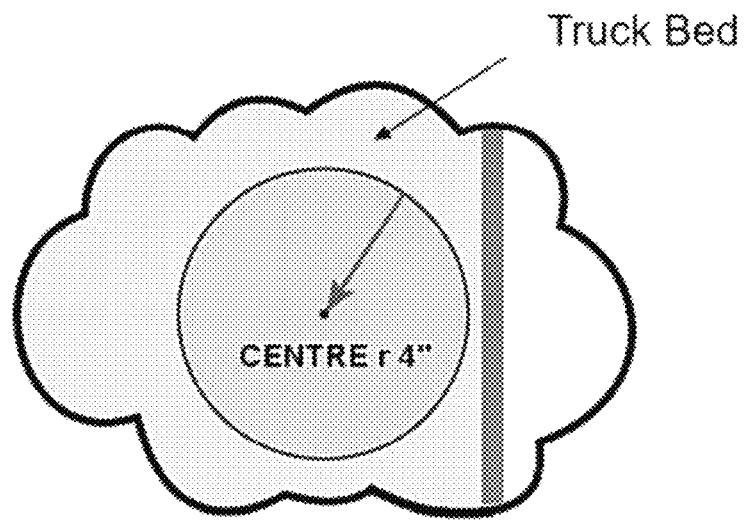
FIGS. 3A-C illustrate sequential steps for installing and aligning a target, a transmitter and a detector, in accordance with one embodiment.
Figure 3B:
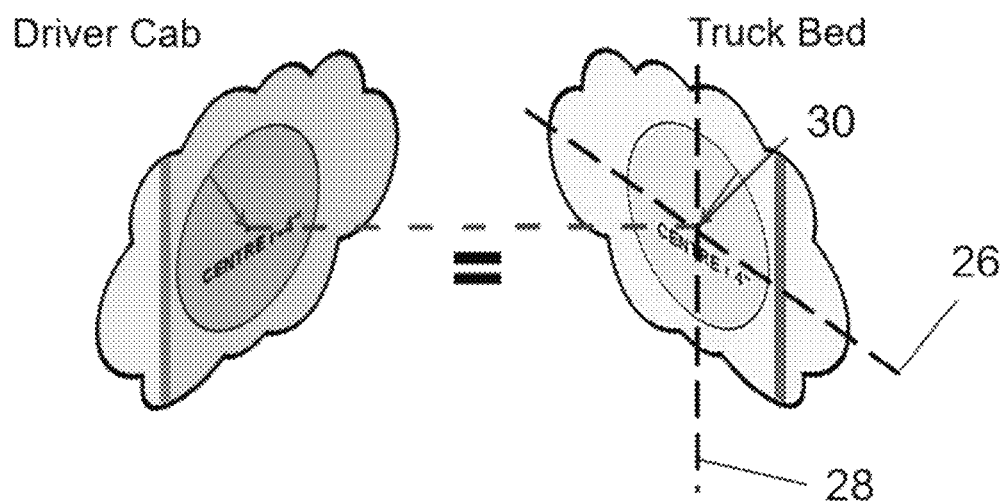
Figure 3C:
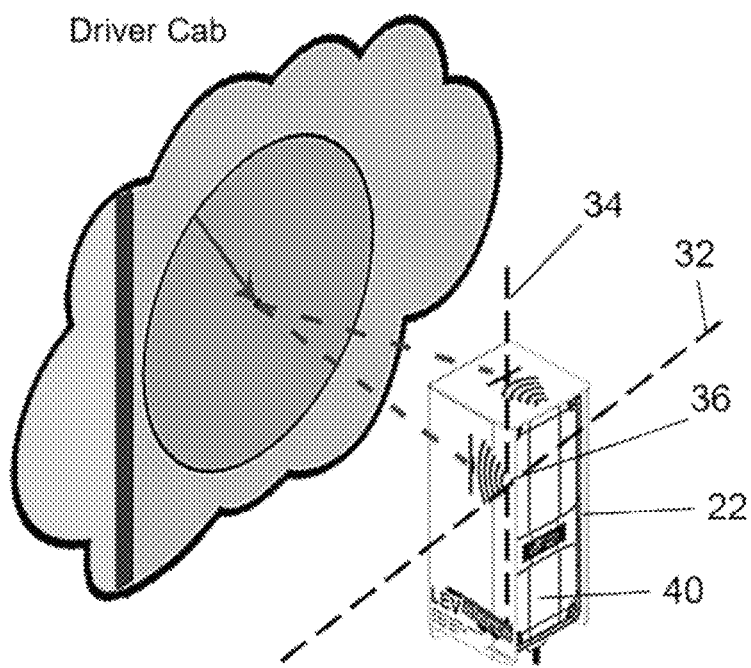

As for its positioning, the target 24 is affixable to a front portion of the truck bed, or in an adjacent region, such that the target 24 can receive the transmission light. As such the target 24 is positioned to be exposed to the transmission light emitted by the transmitter 22. More particularly, the target 24 is aligned with the transmitter 22 when the truck bed is in the loading configuration. With reference to FIGS. 3A-C, the target 24 defines a plane which is associated with two target axes 26, 28 passing through a target center 30, namely a first target axis 26 and a second target axis 28, respectively. These two axes 26,28 are typically non-parallel and are depicted in the FIG. 3B as being orthogonal, i.e., forming an angle of approximately 90° with one another. Similarly, transmitter 22 extends along a plane which can be associated with two axes 32,34 passing through a transmitter center 36, namely first transmitter axis 32 and second transmitter axis 34. These two axes 32,34 are typically non-parallel and are depicted in the FIG. 3C as being orthogonal, i.e., forming an angle of approximately 90° with one another. As such, the alignment of the transmitter 22 and the target 24 typically relies on the alignment of the same along their corresponding axes. For example, in one scenario, the target 24 is fixed to the front portion of the truck bed and the transmitter 22 is fixed to the rear portion of the driver cab. In such a scenario, the first target axis 26 is aligned with the first transmitter axis 32, i.e., the first target axis 26 is parallel or extend in the same plane as the first transmitter axis 32, and the second target axis 28 is aligned with the second transmitter axis 34, i.e., the second target axis 28 is parallel or extend in the same plane as the second transmitter axis 34. In this scenario, the target center 30 and the transmitter center 36 are also aligned. In some embodiments, the first target axis 26 and the first transmitter axis 32 are horizontal, i.e., extending along a direction perpendicular to the force of gravity, and the second target axis 28 and the second transmitter axis 34 are vertical, i.e., extending along a direction parallel to the force of gravity. It will be readily understood that the orientation of the first target axis 26 and the second target axis 28 could be interchanged. Similarly, the first transmitter axis 32 and the second transmitter axis 34 could be also be interchanged. It is to be noted that the of the first target axis 26 and the second target axis 28 could be, in one implementation, planarly rotated, such that the first and second target axes 26,28 form an angle with the direction of the force of gravity. In such implementation, the first and the second transmitter axes 32,34 are planarly rotated by the same angle to maintain the alignment along their two corresponding axes.

Now turning to the optical properties of the target 24, the target 24 is reflective the transmission light. More particularly, the target 24 can reflect light having the same spectral profile as the transmitter 22. In some embodiments, for the transmitter 22 emits light in the infrared portion of the spectrum, and so the target can reflect infrared light.

In some embodiments, the target 24 is made of a material that is infrared reflective. Such a material could be, for example and without being limitative, an adhesive tape 38 reflecting light in the spectral profile of the transmission light of the transmitter 22. In other implementations, the target 24 could be made from paint, tape, fabric, paper and/or coating reflecting the transmission light emitted by the transmitter 22.

Figure 4:
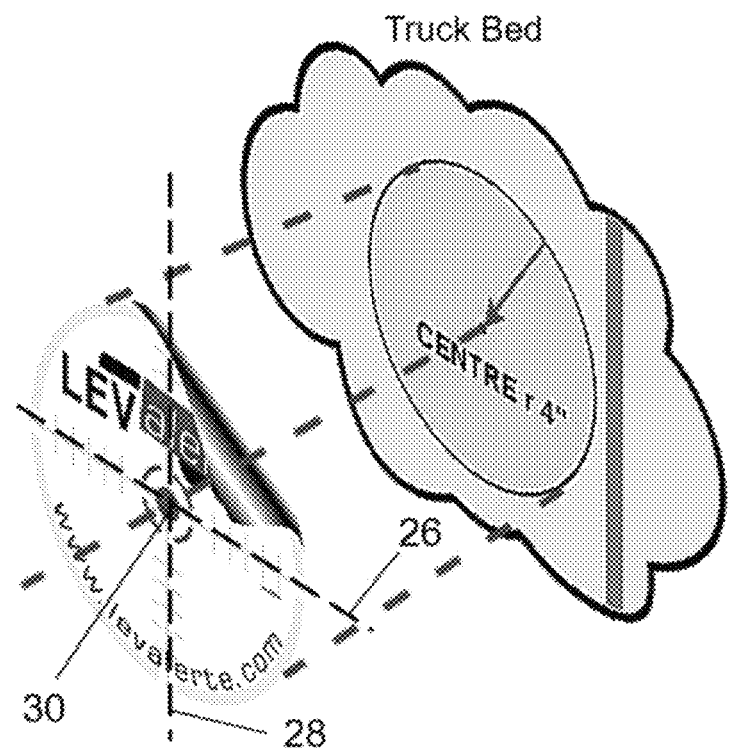
FIG. 4 shows a target about to be mounted on a front portion of a truck bed of a dump truck, in accordance with one embodiment.
Figure 5:
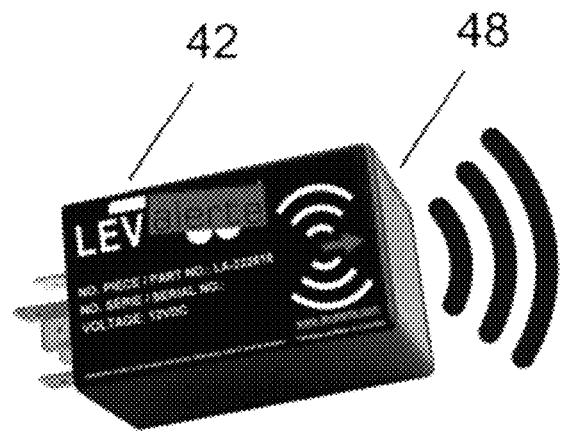
FIG. 5 illustrates a housing including a controller and an audible alarm, in accordance with one embodiment.
Figure 6:
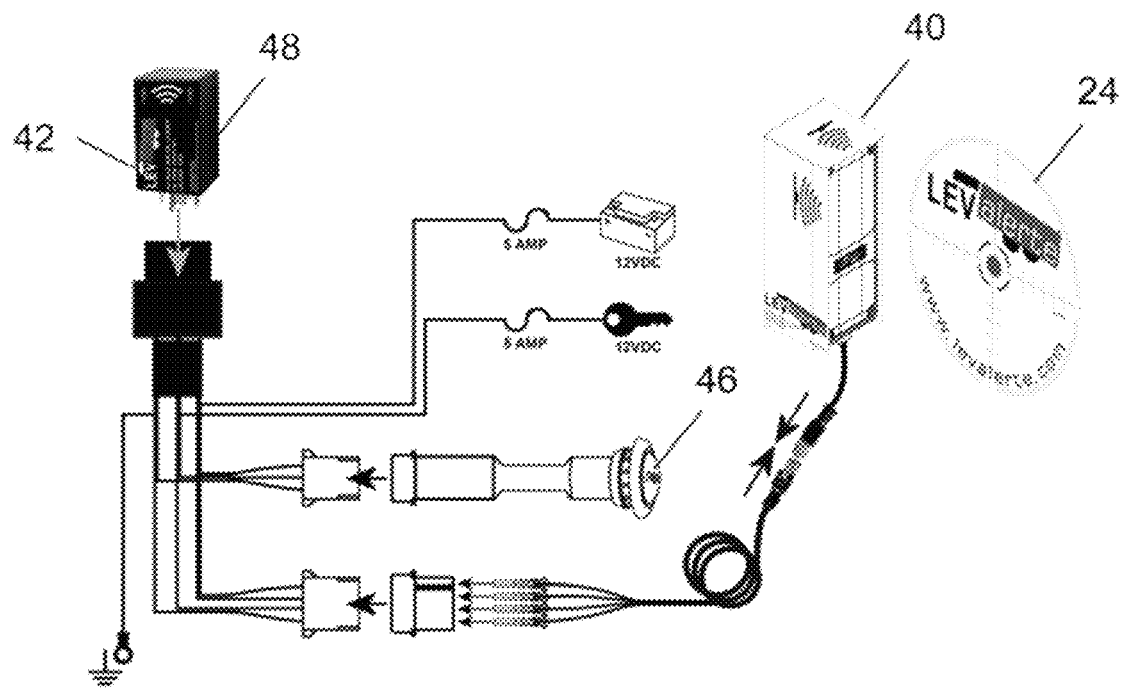
FIG. 6 is an illustration of the operational connections between a controller, an audible alarm, a visual alarm and a detector, in accordance with one embodiment.

Now turning to FIG. 4, the target 24 can be substantially circular. In this embodiment, the first and second target axes 26,28 each coincides with a diameter of the circular shape of the target 24. While the dimensions of the target 24 can vary, the dimensions of the target 24 have to be large enough to account for the deflection in the truck bed position when the dump truck is being loaded or in movement, i.e., the target 24 has to remain aligned with transmitter 22 when the dump truck is in the loading position, but that the truck bed moves, for example under the influence of a force exerted by the presence of a load in the truck bed. In some embodiments, the diameter of the target 24 is about eight inches.

Detector

Now turning to the functional schemes of FIGS. 2A-N, the security system includes a detector 42. The detector 42 is affixable to the rear portion of the driver cab. In other embodiments, the detector 42 is mounted near the lift cylinder (e.g., the lift hydraulic cylinder configured to raise the truck bed).

As for its positioning, the detector 42 is positioned and configured to detect a reflected light. More particularly, the reflected light corresponds to the light reflected by the target 24 after an interaction between the transmission light and the target 24. The interaction results in the transmission light being scattered by the target 24, thereby producing the reflected light. In some implementations, the reflected light can be scattered in all directions. It is to be noted that the detector 42 can directly receive and collect the reflected light. Alternatively, the detector 42 can indirectly receive and collect the reflected light, i.e., optical components can be provided between the target 24 and the detector 40. The expression "optical components" herein refers, but is not limited to lenses, mirrors, filters, and other suitable reflective, refractive and/or diffractive optical components.

Upon reception of the reflected light, the detector 40 is configured to generate a signal representative of a configuration of the truck bed, which is in turn representative of the position of the truck bed, i.e. either a loading configuration ("down position") or an unloading configuration ("up position").

The detector 40 is generally responsive at least in the region of operation of the transmitter 22, i.e., the detector 40 is sensitive to at least a portion of the wavelengths included in the spectral profile of the transmitter 22. However, it will be readily understood that the detector 40 is sensitive to at least a portion of the wavelength includes in the spectral profile of the reflected light. It is to be noted that, in some implementations, the reflected light could be the result of other physical processes than scattering and reflection, for example and without being limitative: fluorescence, luminescence, phosphorescence, photoluminescence, and the like. In such implementations, the target 24 can be modified accordingly.

In some embodiments, the transmitter 22 and the detector 40 form a single integrated device.

It is to be noted that the transmitter 22 and the detector 40 could also rely on the measurement of other physical properties. For example, while most of the description relates to light emission and detection, it could be possible to measure other physical properties of a signal emitted from the transmitter 22 and collected by the detector 40. Such properties could include, but are not limited to phase, period, amplitude, wavelength or a combination thereof. It is to be noted that, in some implementations, the transmitter 22 and the detector 40 could be configured to sense a movement of the target 24. In these implementations, the transmitter 22 and the detector 40 could be integrated into different modules, such as, for example and without being limitative a magnetic field sensor. In these implementations, the target 24 is made from or includes a magnetic material (e.g., a ferrous material) that could be detected by the module including the transmitter 22 and the detector 40. A non-limitative example of such module would be a wire coiled around a magnet.

It is to be noted that the relative position of the transmitter 22, the target 24 and/or the detector 40 may also be adjustable, for example to allow relatively small and precise adjustment and/or tuning in the positioning of these components once mounted and/or affixed to the dump truck and corresponding portions thereof.

Controller and Alarm System

With reference to FIGS. 2A-B, 5 and 6, the security system 20 includes a controller 42. The controller 42 is operatively connected to the detector 40 and is typically provided and mounted behind a dashboard of the dump truck for facilitating its integration and connection to the electrical power source of the dump truck. In some embodiments, the controller 42 is electrically connected to a battery provided in the dump truck.

The controller 42 is configured to receive and process the signal representative of the configuration of the truck bed. Processing of the signal representative of the configuration of the truck bed is performed using techniques already known by one skilled in the art.

The security system also includes an alarm system 44. The alarm system 44 is operatively connected to the controller 42 and is configured to receive instructions therefrom.

The alarm system 44 includes a visual alarm 46 and an audible alarm 48.

Figure 7A:
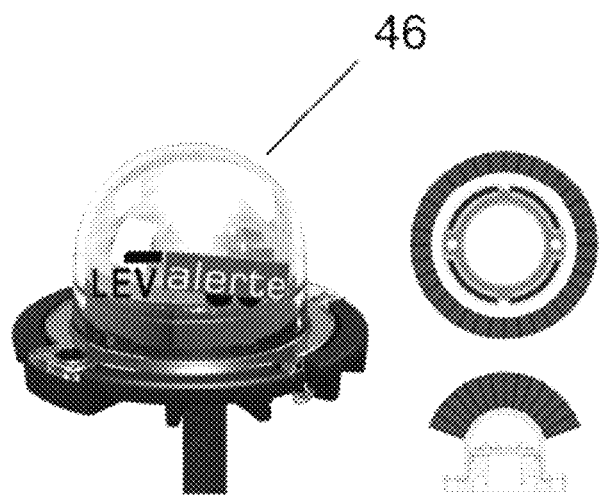
FIGS. 7A-B illustrate an embodiment of a visual alarm.
Figure 7B:
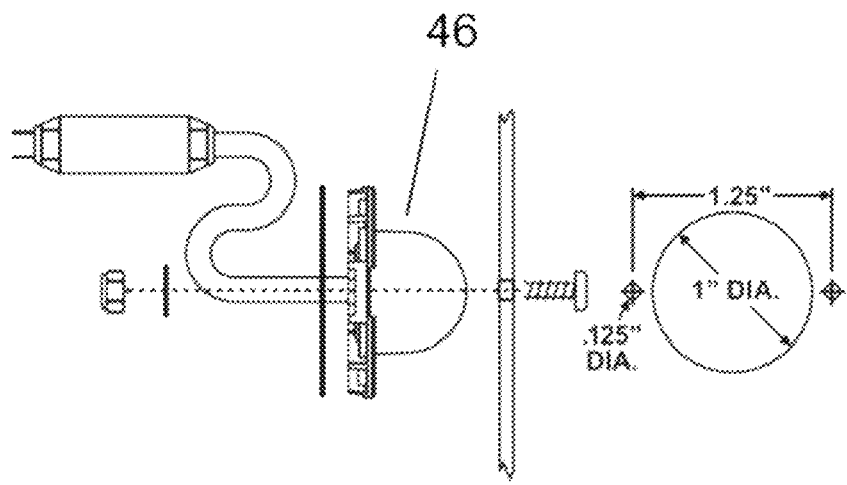

Now turning to FIGS. 7A-B, the visual alarm 46 mounted inside the driver cab to be visible to a user. Generally described, the visual alarm 46 is configured to display one or more colors representative of the configuration of the truck bed, each color being representative of one configuration or position of the truck bed. More particularly, the visual alarm is configured to display a first color when the signal representative of the configuration of the truck bed is indicating that the truck bed is the loading configuration display a second color when the signal representative of the configuration of the truck bed is indicating the truck bed is in the unloading configuration.

In some embodiments, the visual alarm 46 includes a plurality of light-emitting diodes (LEDs). Alternatively, the visual alarm could be embodied by, for example and without being limitative, a solid-state lighting including lasers, organic LEDs (OLEDs), incandescent lighting, halogen lighting, fluorescent light, infrared heat emitters, discharge lighting, combinations thereof or the like.

In some embodiments, the LEDs are positioned and configured such that all of the LEDs simultaneously display either the first color or the second color. In one implementation, the first color is green, and the second color is red. It is to be noted that the visual alarm can either emit in a continuous regime, in an intermittent regime (e.g., flashing light).

The visual alarm 46 can be mounted in a housing, and the LEDs, for example, could be distributed around the periphery of the housing.

The audible alarm 48 is mounted inside the driver cab to be heard by the user. In some implementations, the audible alarm 48 mounted in a casing including the controller 42. The audible alarm is configured to emit a sound when the signal representative of the configuration of the truck bed is indicating the truck bed is the unloading configuration.

In some embodiments, the detector 40 is electrically connected to the controller 42 and the signal representative of the configuration of the truck bed is an electrical signal.

Now turning back to the controller 42, the controller 42 can be programmed such that the signal representative of the configuration of the truck bed indicates that the truck bed is in the unloading configuration when a vertical position of the truck bed reaches a predetermined position threshold value with respect to a predetermined reference position. More particularly, when the target 24 is no longer aligned with the transmitter 22, the transmission light is not reflected by the target 24, and so the detector 40 does not receive a reflected light. In this situation, the controller 42 is programmed to indicate that the truck bed is in the unloading configuration.

In some embodiments, the predetermined position threshold value is about four inches above or below the predetermined reference position. In some implementation, the predetermined position threshold value is a fraction of a dimension of the target (e.g., height, width, diameter or radius). The fraction could be one half (½), or any other fractions. The predetermined position threshold value should however be large enough to allow for normal deflection of the truck bed during normal operations of the dump truck.

In one exemplary embodiment, the predetermined reference position calculated from the center of the target 24.

In some scenarios, it could be advantageous for the controller 42 to be programmed such that at least one of the visual alarm and the audible alarm is delayed by a predetermined delay duration. For example, when the signal representative of the position indicates that the truck bed is in the unloading configuration and that the dump truck moves at a speed below a predetermined speed threshold value. Dump trucks are generally required to move at relatively low speed during paving work, for example and without being limitative, to dispense material on a road being repaired. In one embodiment, the predetermined speed threshold value is adjustable in a range extending from about 15 km/h to about 20 km/h.

In some embodiments, the dump truck security system 20 further includes a global positioning system (GPS) operatively connected to the controller 42. The GPS can be configured to determine the speed at which the dump truck is moving, so that the controller 42 can evaluate if the dump truck is moving at a speed above, below or equal to the predetermined speed threshold value and send appropriate corresponding instructions to the alarm system 44.

In some embodiments, the predetermined delay duration is about 60 seconds. Of course, this predetermined delay duration could vary according to one's needs. After the predetermined delay duration, at least one of the visual alarm displays the second color and the audible alarm emits the sound to remind the driver that the vehicle is movement and that the dump truck is in the unloading configuration.

In some embodiments, the alarm system 44 is electrically connected to the controller 42. Alternatively, the alarm system 44 can be wirelessly connected to the controller 42.

In some embodiments, the controller 42 includes a logic circuit.

Kit for Distinguishing a Loading Configuration and an Unloading Configuration

The security system 20 described so far can be provided as being part of a kit for distinguishing a loading configuration and an unloading configuration of a truck bed located behind a driver cab. The kit includes at least one alarm system 44. The alarm system has a broad variety of characteristics, components and features, such as the ones which have been presented in the current description, namely, a visual alarm and an audible alarm.

The kit can further include a transmitter 22, a target 24, a detector 40 and a controller 42 similar to the ones which have been previously described.

The different components of the kit can be assembled on-site or can be partially pre-assembled prior to incorporating alarm system into the dump truck. Each kit can also include, in some cases, other can further include electronics, mechanical, electromechanical or optical components and/or devices required for the functioning of the security system once implemented. Such components can include, for example and without being limitative, electrical circuits, batteries, resistors, inductors, capacitors, switches, current and/or voltage sources, resistances, inductances, capacitances, optical fibers, lenses, mirrors, filters, gratings, prisms, windows, laser, laser diode(s), combinations thereof, or any other components useful for an optical detection of the loading and unloading configuration of the truck bed of the dump truck.

Additional electrical, optical and/or mechanical components and/or pieces could also be provided in the kit, such as, for example, wires, connector and the like to allow the installation of the kit, and thus the dump truck security system 20.

In one implementation, there is provided a kit for distinguishing a loading position and an unloading position of a truck bed. The kit includes a transmitter operable to generate a transmission light having a spectral profile; a target reflective in the spectral profile of the transmission light; a detector operable to detect a reflected light and generate a signal representative of a configuration of a truck bed; a controller operable to receive and process the signal representative of the configuration of the truck bed; and an alarm system including an audible alarm, the audible alarm being configured to emit a sound when the signal representative of the configuration of the truck bed is indicating the truck bed is the unloading configuration. The kit of this implementation can optionally include a visual alarm configured to display a first color when the signal representative of the configuration of the truck bed is indicating that the truck bed is the loading configuration and display a second color when the signal representative of the configuration of the truck bed is indicating the truck bed is in the unloading configuration.

Figure 8:
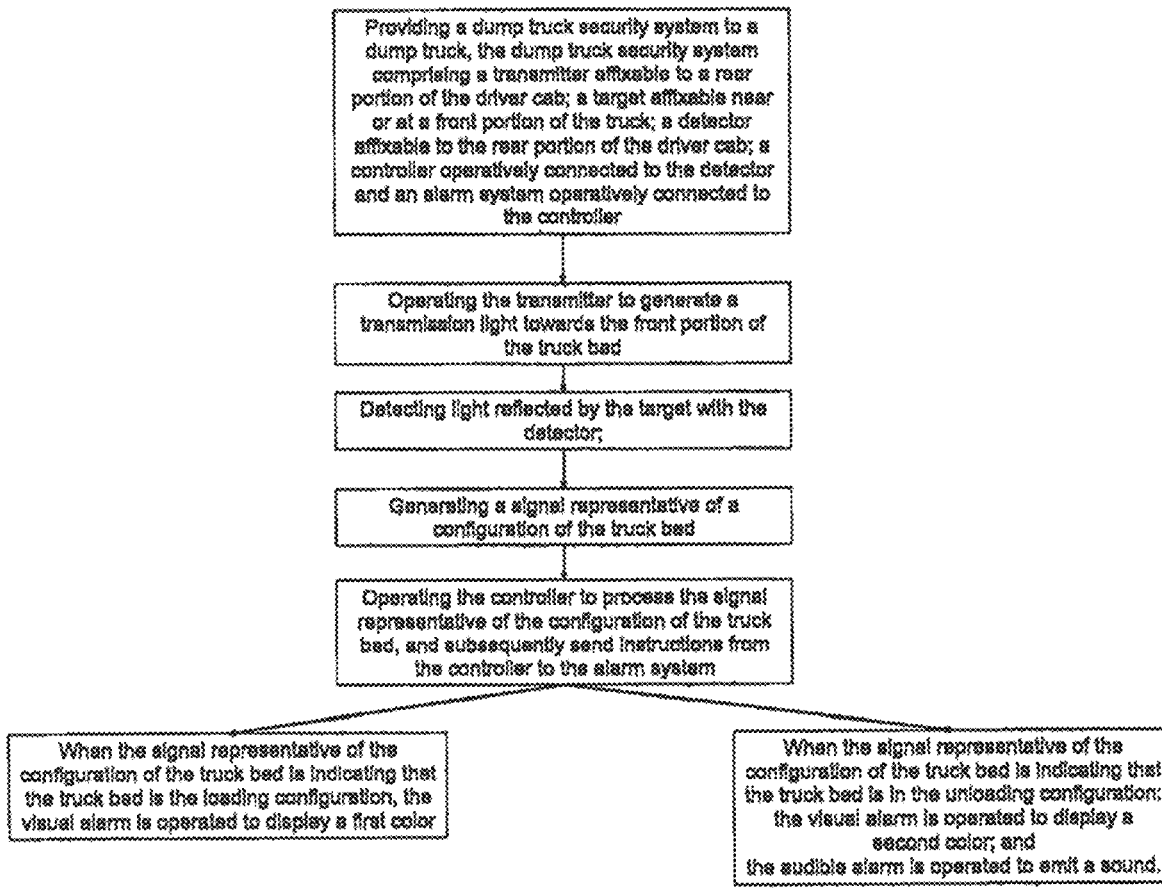
FIG. 8 is a workflow chart of a method for distinguishing a loading configuration and an unloading configuration of a truck bed located behind a driver cab, in accordance with one embodiment.

Method for Distinguishing a Loading Configuration and an Unloading Configuration According to one general embodiment, and as illustrated in the workflow chart depicted in FIG. 8, there is provided a method for distinguishing the loading configuration and the unloading configuration of the truck bed located behind the driver cab. Embodiments and implementations of this method rely on the security system and kit which have been described in the previous sections The method includes steps of generating a transmission light towards the truck bed; detecting a reflected light at a rear portion of the driver cab; generating a signal representative of a configuration of the truck bed; processing the signal representative of the configuration of the truck bed; and operating an alarm system including a visual alarm and an audible alarm. Such operation includes, when the signal representative of the configuration of the truck bed is indicating that the truck bed is the loading configuration, that the visual alarm is operated to display a first color. When the signal representative of the configuration of the truck bed is indicating that the truck bed is in the unloading configuration, the visual alarm is operated to display a second color and the audible alarm is operated to emit a sound.

Figure 9:
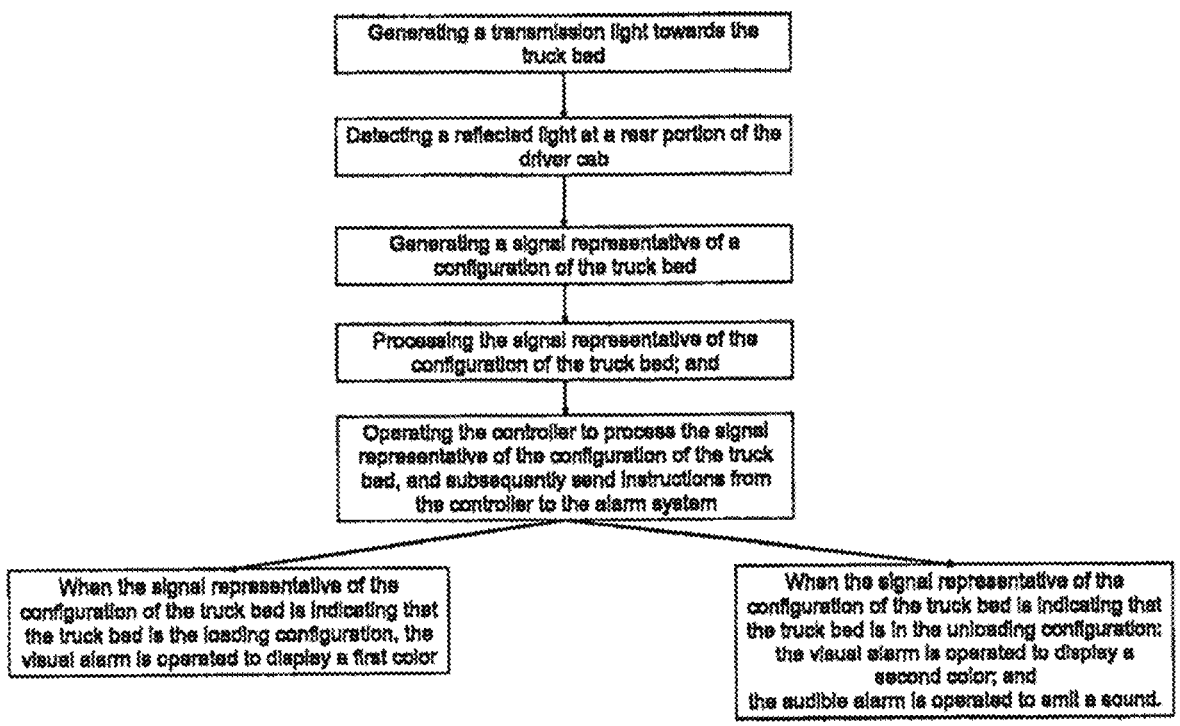
FIG. 9 is a workflow chart of a method for distinguishing a loading configuration and an unloading configuration of a truck bed located behind a driver cab, in accordance with another embodiment.

In one exemplary implementation, and with reference to FIG. 9, there is provided a method for distinguishing the loading configuration and the uploading configuration of the truck bed located behind the driver cab.

The method includes providing a dump truck security system to a dump truck, the dump truck security system including: a transmitter affixable to a rear portion of the driver cab; a target affixable near or at a front portion of the truck; a detector affixable to the rear portion of the driver cab; a controller operatively connected to the detector; and an alarm system operatively connected to the controller.

The method includes operating the transmitter to generate a transmission light towards the front portion of the truck bed; detecting light reflected by the target with the detector; generating a signal representative of a configuration of the truck bed; and operating the controller to process the signal representative of the configuration of the truck bed, and subsequently send instructions from the controller to the alarm system. When the signal representative of the configuration of the truck bed is indicating that the truck bed is the loading configuration, the visual alarm is operated to display a first color. When the signal representative of the configuration of the truck bed is indicating that the truck bed is in the unloading configuration, the visual alarm is operated to display a second color and the audible alarm is operated to emit a sound.

In accordance with another aspect, there is also provided a method for installing a dump truck security system for distinguishing a loading configuration and an uploading configuration of a truck bed located behind a driver cab, the method including: engaging a target with a front portion of the truck bed; aligning a transmitter with the target; engaging the transmitter with a rear portion of the driver cab; mounting a detector to the rear portion of the driver cab; operatively connecting a controller with the detector; mounting the controller in the driver cab; operatively connecting an alarm system with the controller; and mounting the alarm system in the drive cab.

The installation method can also optionally include, in some embodiment a two-axis alignment (also sometimes referred a two-dimensional alignment). In this embodiment, the step of aligning the transmitter with the target includes determining a first target axis and a second target axis; determining a first transmitter axis and a second transmitter axis; aligning said first target axis with said first transmitter axis; and aligning said second target axis with said second transmitter axis.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the scope defined in the appended claims.

The invention claimed is:

1. A dump truck security system for distinguishing a loading configuration and an unloading configuration of a truck bed, the dump truck security system comprising:
   a transmitter affixable to a rear portion of the driver cab, wherein the transmitter is oriented and configured to generate a transmission light towards a front portion of the truck bed, the transmission light having a spectral profile;
   a target positioned near or at a front portion of the truck bed and aligned with the transmitter when the truck bed is in the loading configuration, wherein the target reflects light in the spectral profile of the transmission light;
   a detector affixed to the rear portion of the driver cab, wherein the detector is positioned and configured to detect a reflected light in the spectral profile of the transmission light and generate a signal representative of a configuration of the truck bed;
   a controller operatively connected to the detector, wherein the controller is configured to receive and process the signal representative of the configuration of the truck bed; and
   an alarm system operatively connected to the controller and configured to receive instructions therefrom, the alarm system comprising:
      an audible alarm mounted inside the driver cab, wherein the audible alarm is configured to emit a sound when the signal representative of the configuration of the truck bed indicates the truck bed is the unloading configuration.

2. The dump truck security system of claim 1, wherein the alarm system further comprises a visual alarm mounted inside the driver cab, wherein the visual alarm is configured to:
   display a first color when the signal representative of the configuration of the truck bed indicates that the truck bed is the loading configuration; and
   display a second color when the signal representative of the configuration of the truck bed indicates that the truck bed is in the unloading configuration.

3. The dump truck security system of claim 1, wherein the spectral profile of the transmission light comprises an infrared band.

4. The dump truck security system of claim 1, wherein the spectral profile of the transmission light ranges from about 700 nm to about 1 mm.

5. The dump truck security system of claim 1, wherein the transmitter and the detector form a single integrated device.

6. The dump truck security system of claim 1, wherein the target comprises an adhesive tape reflecting light in the spectral profile of the transmission light.

7. The dump truck security of claim 1, wherein the target is painted on the front portion of the truck bed.

8. The dump truck security of claim 1, wherein the target is affixed at the front portion of the truck bed.

9. The dump truck security system of claim 1, wherein the target is substantially circular and has a diameter of about eight inches.

10. The dump truck security system of claim 1, wherein the target defines a target plane associated with a first target axis and a second target axis passing through a target center.

11. The dump truck security system of claim 10, wherein the transmitter extends along a transmitter plane associated with a first transmitter axis and a second transmitter axis passing through a transmitter center.

12. The dump truck security system of claim 11, wherein:
   the first target axis is parallel with the first transmitter axis; and
   the second target axis is aligned with the second transmitter axis.

13. The dump truck security system of claim 11, wherein:
   the first target axis and the first transmitter axis extend along a substantially horizontal direction; and
   the second target axis and the second transmitter axis extend along a substantially vertical direction parallel to the force of gravity.

14. The dump truck security system of claim 1, wherein the controller is programmed such that the signal representative of the configuration of the truck bed indicates that the truck bed is in the unloading configuration when a vertical position of the truck bed reaches a predetermined position threshold value with respect to a predetermined reference position.

15. The dump truck security system of claim 2, wherein the controller is programmed such that at least one of the visual alarm and the audible alarm is delayed by a predetermined delay duration when:
   the signal representative of the position indicates that the truck bed is in the unloading configuration; and the dump truck moves at a speed below a predetermined speed threshold value.

16. The dump truck security system of claim 15, wherein the predetermined speed threshold value is adjustable in a range extending from about 15 km/h to about 20 km/h.

17. The dump truck security system of claim 15, further comprising a global positioning system (GPS) operatively connected to the controller, wherein the GPS is configured to determine the speed at which the dump truck is moving.

18. The dump truck security system of claim 15, wherein, after the predetermined delay duration, at least one of:
the visual alarm displays the second color; and
the audible alarm emits the sound.

19. The dump truck security system of claim 1, wherein the detector is electrically connected to the controller and the signal representative of the configuration of the truck bed is an electrical signal.

20. The dump truck security system of claim 1, wherein the controller is mounted behind a dashboard of the dump truck.

21. A method for distinguishing a loading configuration and an uploading configuration of a truck bed located behind a driver cab, the method comprising:
providing a dump truck security system to a dump truck, the dump truck security system comprising:
a transmitter affixable to a rear portion of the driver cab;
a target affixable near or at a front portion of the truck;
a detector affixable to the rear portion of the driver cab;
a controller operatively connected to the detector; and
an alarm system operatively connected to the controller, the alarm system comprising an audible alarm;
operating the transmitter to generate a transmission light towards the front portion of the truck bed;
detecting light reflected by the target with the detector;
generating a signal representative of a configuration of the truck bed; and
operating the controller to process the signal representative of the configuration of the truck bed, and send instructions from the controller to the alarm system, such that:
when the signal representative of the configuration of the truck bed is indicating that the truck bed is in the unloading configuration, the audible alarm emits a sound.

22. The method of claim 21, wherein the alarm system further comprises a visual alarm, the controller being configured such that:
when the signal representative of the configuration of the truck bed indicates that the truck bed is the loading configuration, the visual alarm displays a first color; and
when the signal representative of the configuration of the truck bed indicates that the truck bed is in the unloading configuration, the visual alarm displays a second color.

23. A method for distinguishing a loading configuration and an uploading configuration of a truck bed located behind a driver cab, the method comprising:
generating a transmission light towards the truck bed;
detecting a reflected light at a rear portion of the driver cab;
generating a signal representative of a configuration of the truck bed;
processing the signal representative of the configuration of the truck bed; and
operating an alarm system comprising an audible alarm such that:
when the signal representative of the configuration of the truck bed indicates that the truck bed is in the unloading configuration:
the visual alarm displays a second color; and
the audible alarm emits a sound.

24. The method of claim 23, wherein the alarm system further comprises a visual alarm, the controller being configured such that:
when the signal representative of the configuration of the truck bed indicates that the truck bed is the loading configuration, the visual alarm displays a first color; and
when the signal representative of the configuration of the truck bed indicates that the truck bed is in the unloading configuration, the visual alarm displays a second color.

25. A method for installing a dump truck security system for distinguishing a loading configuration and an uploading configuration of a truck bed located behind a driver cab, the method comprising:
engaging a target with a front portion of the truck bed;
aligning a transmitter with the target;
engaging the transmitter with a rear portion of the driver cab;
mounting a detector to the rear portion of the driver cab;
operatively connecting a controller with the detector;
mounting the controller in the driver cab;
operatively connecting an alarm system with the controller; and
mounting the alarm system in the drive cab.

26. The method of claim 25, wherein the aligning comprises:
determining a first target axis and a second target axis;
determining a first transmitter axis and a second transmitter axis;
aligning the first target axis with the first transmitter axis; and
aligning the second target axis with the second transmitter axis.

* * * * *